(12) United States Patent
Wada

(10) Patent No.: US 8,281,097 B2
(45) Date of Patent: Oct. 2, 2012

(54) CONTROL UNIT FOR STORAGE DEVICE AND METHOD FOR CONTROLLING STORAGE DEVICE

(75) Inventor: Mihoko Wada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 314 days.

(21) Appl. No.: 12/792,929

(22) Filed: Jun. 3, 2010

(65) Prior Publication Data

US 2010/0332778 A1 Dec. 30, 2010

(30) Foreign Application Priority Data

Jun. 30, 2009 (JP) ................................. 2009-155599

(51) Int. Cl.
*G06F 12/00* (2006.01)

(52) U.S. Cl. ...................................................... 711/162

(58) Field of Classification Search ......................... None
See application file for complete search history.

(56) References Cited

U.S. PATENT DOCUMENTS

| 7,596,676 B2* | 9/2009 | Serizawa et al. ............... 711/203 |
| 2007/0130423 A1 | 6/2007 | Liu et al. |
| 2008/0313641 A1 | 12/2008 | Inoue et al. |
| 2009/0150639 A1* | 6/2009 | Ohata ........................... 711/172 |

FOREIGN PATENT DOCUMENTS

| JP | 2007-156815 | 6/2007 |
| JP | 2008-310734 | 12/2008 |

* cited by examiner

*Primary Examiner* — Hiep Nguyen
(74) *Attorney, Agent, or Firm* — Staas & Halsey LLP

(57) ABSTRACT

A storage device includes storage units, a management section that manages a logically defined storage area as a real logical volume by associating the storage area with a physical storage area created using the storage units in advance and manages the logically defined storage area as a virtual logical volume by associating the storage area with a physical storage area when data is added, a determination section that determines whether the activity ratio of the virtual logical volume exceeds a threshold and whether the physical storage area associated with a storage area of the virtual logical volume is managed by another control unit, and a migration section that migrates data stored in the virtual logical volume to a real logical volume when the activity ratio exceeds the threshold and the physical storage area associated with the storage area of the virtual logical volume managed by another control unit.

7 Claims, 6 Drawing Sheets

CONTROL UNIT FOR STORAGE DEVICE AND METHOD FOR CONTROLLING STORAGE DEVICE

CROSS-REFERENCE TO RELATED APPLICATIONS

This application is based upon and claims the benefit of priority of the prior Japanese Patent Application No. 2009-155599, filed on Jun. 30, 2009, the entire contents of which are incorporated herein by reference.

FIELD

Embodiments discussed herein relate to volume management of storage devices.

BACKGROUND

Techniques for virtualizing storage devices include using virtual logical volumes (hereinafter also simply referred to as thin provisioning volumes) to which storage areas are dynamically allocated when write requests are issued.

When typical logical volumes (hereinafter also referred to as real logical volumes) are created, all the storage areas with the defined capacities are allocated to physical disks or real storages in, for example, array groups in advance.

In contrast, when thin provisioning volumes are created, only the capacities are defined, and no storage areas are allocated to real storages. That is, it is not until requests for writing in the thin provisioning volumes are issued that storage areas of the required size are allocated to the real storages.

The thin provisioning volumes do not require all the storage areas with the defined capacities to be prepared in advance, and areas with a size suitable for practical use are dynamically ensured when write requests are issued. Therefore, use of the virtual logical volumes allows installation of physical disks with essential capacities when storage devices are introduced and addition of physical disks when the capacities become inadequate in accordance with the subsequent usage. In this manner, costs for introduction and management of the storage devices can be reduced by increasing the use efficiency of the disks.

A storage device adopting thin provisioning volumes includes at least one control unit (CM: centralized module) that accesses real storage areas in real storages by reading accesses made to virtual storage areas of the thin provisioning volumes as the accesses to the real storage areas.

The storage device can include a plurality of CMs, and each CM is connected to real storages in units of RAID groups. Herein, each CM connected to the real storages is referred to as a CM in charge of real storages. Moreover, each CM retaining mapping information indicating correspondences between the thin provisioning volumes and the real storages in the cache memory is referred to as a CM in charge of the thin provisioning volumes since the CM accesses the real storages by reading accesses made to the thin provisioning volumes as those to the real storages.

The storage areas of the real storages corresponding to the storage areas of the thin provisioning volumes can be allocated to any real volumes assigned to the plurality of CMs. That is, the storage areas of the real storages corresponding to those of the thin provisioning volumes can be distributed over the plurality of real storages.

Therefore, when a host computer accesses data stored in a thin provisioning volume, the storage device first determines a real storage by referring to the mapping information of the CM in charge of the target thin provisioning volume. Subsequently, the storage device performs accesses such as read/write processes through communication between the CM in charge of the thin provisioning volume and the CM in charge of the real storage.

That is, processing time of data access to the thin provisioning volumes is longer than the processing time of data access to the real logical volumes due to the communication between the CMs.

Moreover, although the thin provisioning volumes have advantages as described above when the capacity in use of the thin provisioning volumes is lower than the defined capacity, the advantages disappear when the capacity in use becomes substantially the same as the defined capacity since real storages with a storage capacity equivalent to the defined capacity are required.

Therefore, the real logical volumes, which have better data access performance, are more appropriate than the thin provisioning volumes at the stage where the capacity in use of the thin provisioning volumes becomes the same as the defined capacity.

SUMMARY

A storage device includes storage units, a management section that manages a logically defined storage area as a real logical volume by associating the storage area with a physical storage area created using the storage units in advance and manages the logically defined storage area as a virtual logical volume by associating the storage area with a physical storage area when data is added, a determination section that determines whether the activity ratio of the virtual logical volume exceeds a threshold and whether the physical storage area associated with a storage area of the virtual logical volume is managed by another control unit, and a migration section that migrates data stored in the virtual logical volume to a real logical volume when the activity ratio exceeds the threshold and the physical storage area associated with the storage area of the virtual logical volume managed by another control unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF THE EMBODIMENTS

Embodiments will now be described with reference to the drawings. The structures of the embodiments are intended as example only, and do not limit the structures of the embodiments.

Figure 1:
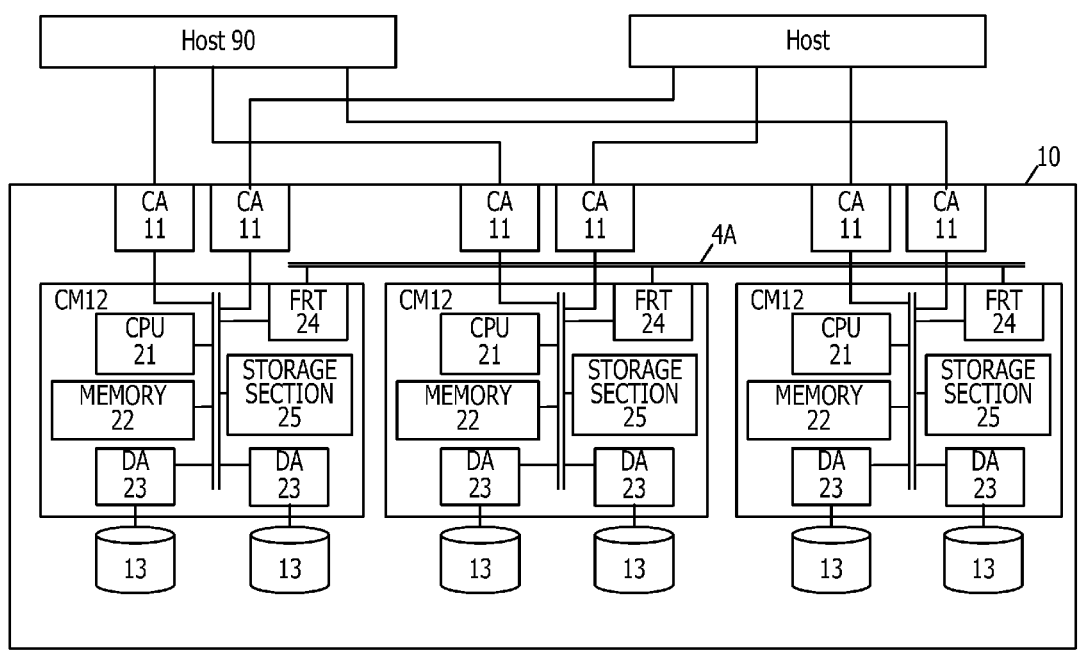
FIG. 1 schematically illustrates a storage device according to a first embodiment.

As shown in FIG. 1, a storage device 10 includes channel adapters (CAs) 11, control units (CMs: centralized modules) 12, and real storages 13.

The CAs 11 are interfaces connected to host computers 90 so as to control the communication with the host computers 90.

The CMs 12 control accesses to the real storages 13 in response to requests issued from the host computers 90.

The real storages 13 are high-capacity storage units such as hard disk drives that store data requested by the host computers 90.

The storage device 10 according to the first embodiment includes the plurality of real storages 13 grouped using RAID (redundant arrays of inexpensive disks) technology in order to achieve high capacity and redundancy, and includes the plurality of CMs 12 each corresponding to a RAID group of the real storages 13.

Each of the CMs 12 includes a CPU 21, a memory 22, device adapters (DAs) 23, a front-end router (FRT) 24, and a storage section 25.

The memory 22 functions as a cache used when the real storages 13 are accessed and a main memory used when the CPU 21 performs computation.

The DAs 23 are interfaces connected to the real storages 13, and control accesses to the real storages 13.

The FRT 24 is an interface that controls the communication between the CMs 12 via a communication path 4A.

The storage section 25 includes, for example, a hard disk drive, a memory disk drive, and a ROM, and stores OSes or firmware (programs).

The CPU 21 executes the OSes or firmware read out of the storage section 25 as appropriate, and computes information read out of the CAs 11, the DAs 23, the FRT 24, and the real storages 13. That is, the CPU functions as a management section, a detection section, a migration section, and a read/write section.

The CPU 21 serving as the management section manages logically defined storage areas as real logical volumes by associating the storage areas with physical storage areas in advance. Moreover, the CPU 21 serving as the management section manages the logically defined storage areas as thin provisioning volumes by associating the storage areas with physical storage areas when data is written.

Figure 2:
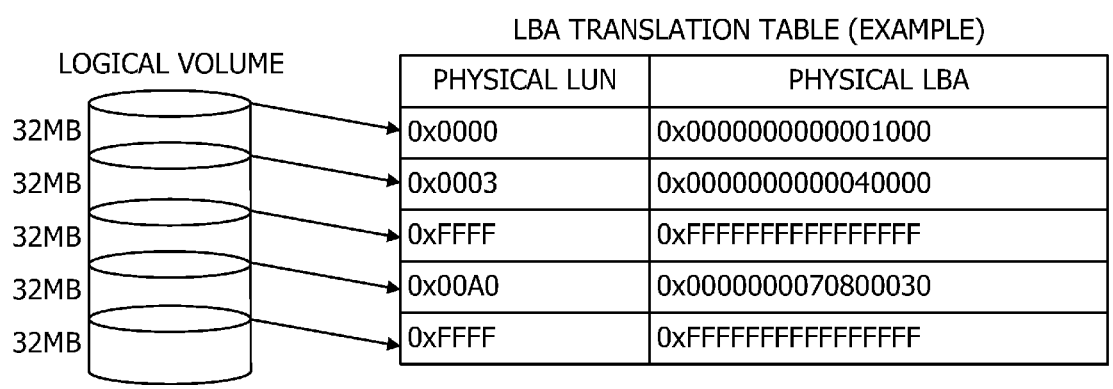
FIG. 2 illustrates a translation table.

The CPU 21 serving as the management section has correspondences between the logical storage areas and the physical storage areas registered in a translation table in the memory 22. As shown in FIG. 2, the translation table illustrates the correspondences between the logical block addressing (LBA) of the logical volume and the logical unit number (LUN) and the LBA of the real storage.

Moreover, the CPU 21 serving as the management section reads identification information out of the real storages 13 when the real storages 13 are connected to the DAs 23, and adds the identification information to a table of assigned storages in the memory 22 as information indicating that the CM 12 including the CPU takes charge of the real storages 13. Furthermore, the CPU 21 associates the identification information of the CM 12 including the CPU with the identification information of the real storages 13 assigned to the CM, and sends the correspondences to other CMs 12 so that the tables of the storages assigned to the other CMs 12 are updated. The tables of the assigned storages indicate which CMs 12 take charge of which real storages, and include correspondences between the identification information of the CMs 12 that take charge of the real storages 13 and the identification information of the storages assigned to the CMs.

The CPU 21 serving as the detection section detects whether or not the following conditions are satisfied, that is, whether or not the activity ratio of the thin provisioning volumes exceeds a threshold and whether or not the physical storage areas corresponding to the storage areas of the thin provisioning volumes are managed by (assigned to) other CMs. For example, the CPU 21 refers to the translation table so as to determine a ratio $Qa/Qz$ of the total capacity $Qa$ of the storage areas defined as the thin provisioning volumes to the capacity $Qz$ of the storage areas of the real storages 13 associated with the logical storage areas of the thin provisioning volumes as the activity ratio of the thin provisioning volumes. Subsequently, the CPU 21 refers to the translation table so as to determine whether or not the logical storage areas of the thin provisioning volumes are associated with the storage areas of the real storages 13 managed by other CMs 12.

The CPU 21 serving as the migration section migrates data stored in the thin provisioning volumes to the real logical volumes when the detection section determines that the above-described conditions are satisfied. That is, the CPU 21 allocates physical storage areas with a capacity equivalent to the capacity of the thin provisioning volumes to the free spaces of the real storages 13, and moves the data stored in the thin provisioning volumes to the storage areas. At this time, when the areas of the thin provisioning volumes including the data to be migrated are not allocated to the physical storage areas, migration of data is unnecessary, and is not performed.

The CM 12 also serves as a computer including the CPU 21 and performing the functions of the sections C1 to C4 by executing programs. Herein, the programs (firmware) can be stored in recording media that can be read by computers. The recording media that can be read by the computers include those in which information such as data and programs are electrically, magnetically, optically, mechanically, or chemically stored and from which the computers can read the information. Recording media detachable from the computers among the above-described media include, for example, flexible disks, magneto-optical disks, CD-ROMs, CD-R/Ws, DVDs, DATs, 8 mm tapes, and memory cards.

Moreover, recording media fixed to the computers include, for example, hard disks and read-only memories (ROMs).

Figure 3:
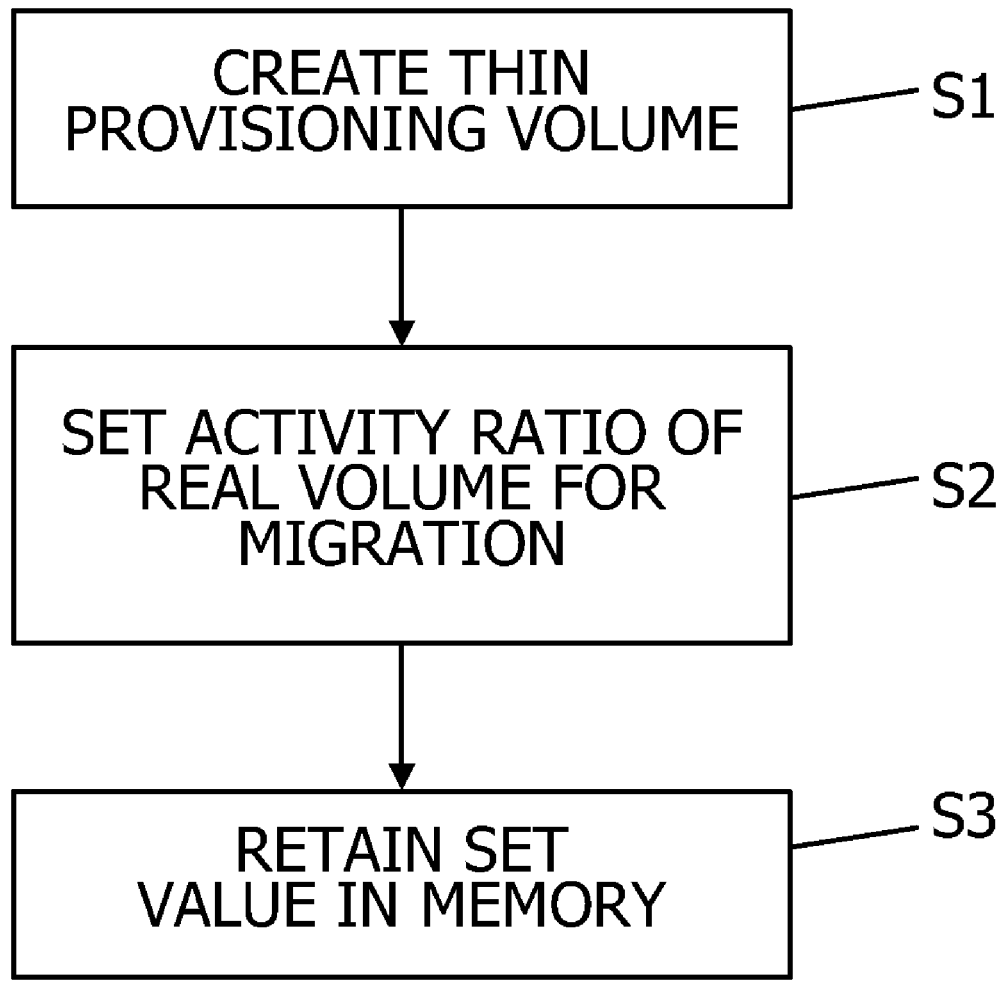
FIG. 3 illustrates procedures for setting a thin provisioning volume.

FIG. 3 illustrates procedures for setting a thin provisioning volume in the storage device 10.

When a new thin provisioning volume is created, an operator accesses the storage device 10 from, for example, a management terminal (not shown) such as a terminal connected to the storage device 10 or from an operating section (not shown) of the storage device 10, selects a CM 12 in which the thin provisioning volume is created, and instructs the storage device to create the thin provisioning volume by specifying the storage capacity. In the storage device 10 that has received the instruction, the CPU 21 of the selected CM 12 writes definitions such as the volume name, the storage capacity, and the type indicating that the volume is a thin provisioning volume into the memory 22 so as to create the thin provisioning volume (S1).

Subsequently, the operator inputs the activity ratio of the thin provisioning volume for migration. When the storage device 10 receives the activity ratio (S2), the CPU 21 of the CM 12 writes the activity ratio into the memory 22 as a threshold (S3).

For example, the OS can recognize the thin provisioning volume as a device with the defined storage capacity since the CM 12 manages the thin provisioning volume in accordance with these definitions. When the volume is created, the CPU 21 of the CM 12 sends volume location information including correspondences between the identification information with which the volume can be specified and the identification information with which the CPU can distinguish the CM 12 including the CPU from other CMs 12 to all the other CMs 12. That is, all the CMs share the volume location information indicating which volumes are managed by (assigned to) which CMs 12.

Figure 4:
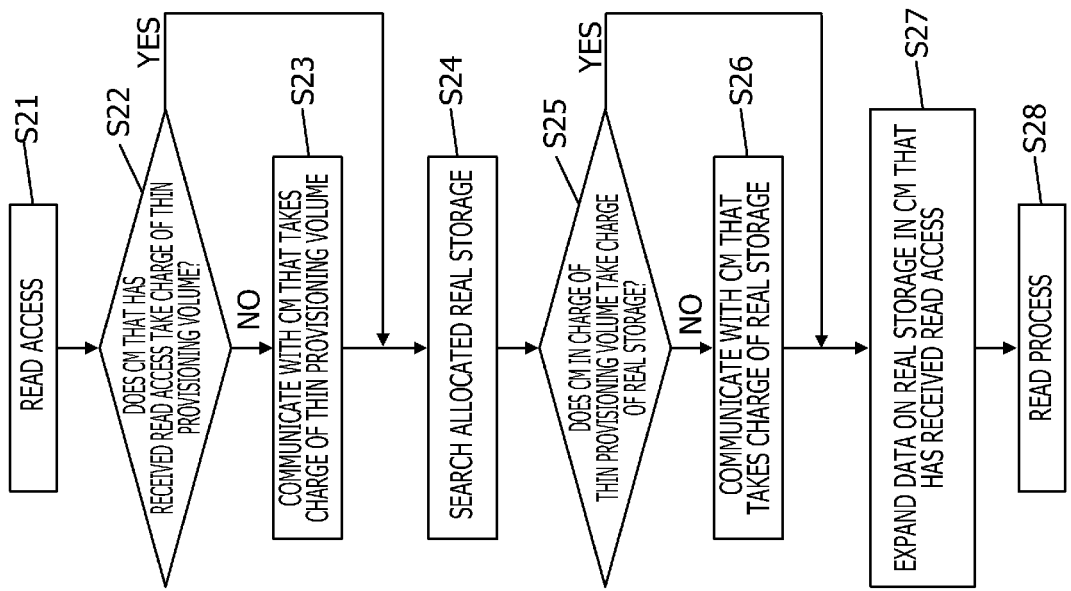
FIG. 4 illustrates procedures for reading data from a thin provisioning volume.

FIG. 4 illustrates procedures for reading data from a thin provisioning volume.

When a host computer 90 sends a request for reading data from the thin provisioning volume to the storage device 10, a CM 12 receives the read request via a CA 11 (S21).

The CM 12 that has received the read request determines whether or not the thin provisioning volume serving as the read target is under the management thereof. For example, the CM 12 refers to the memory 22, and determines whether or not the thin provisioning volume serving as the read target is defined in the memory (S22).

When the thin provisioning volume serving as the read target is not under the management of the CM 12 that has received the read request (No in S22), the CM 12 that has received the read request determines the CM 12 that manages the thin provisioning volume serving as the read target by referring to the volume location information. Subsequently, the CM 12 that has received the read request transmits the read request to the CM 12 that manages the thin provisioning volume serving as the read target through communication between the CMs via the RAs 24 (S23).

The CM 12 to which the read request is transmitted in S23 or the CM 12 determined to be the one that manages the thin provisioning volume serving as the read target in S22 refers to the translation table, and searches the real storage 13 serving as the read target (S24).

The CM 12 refers to the table of the assigned storages, and determines whether or not the real storage 13 serving as the read target searched in S24 is assigned thereto, that is, is directly connected to the CM without any other CMs 12 interposed therebetween (S25).

When the real storage serving as the read target is not assigned to the CM (No in S25), the CM 12 transmits the read request to the CM 12 that takes charge of the real storage 13 serving as the read target through the communication between the CMs via the FRTs 24 (S26).

The CM 12 to which the read request is transmitted in S26 or the CM 12 determined to be the one that takes charge of the real storage serving as the read target in S25 reads data out of the real storage 13 in accordance with the read request. Subsequently, the CM 12 sends the data to the CM 12 that has received the read request from the host computer 90 so that the data is expanded in the memory 22 (S27).

The CM 12 that has received the data sends the data expanded in the memory 22 to the host computer 90 (S28). In this manner, the read process is completed.

Figure 5:
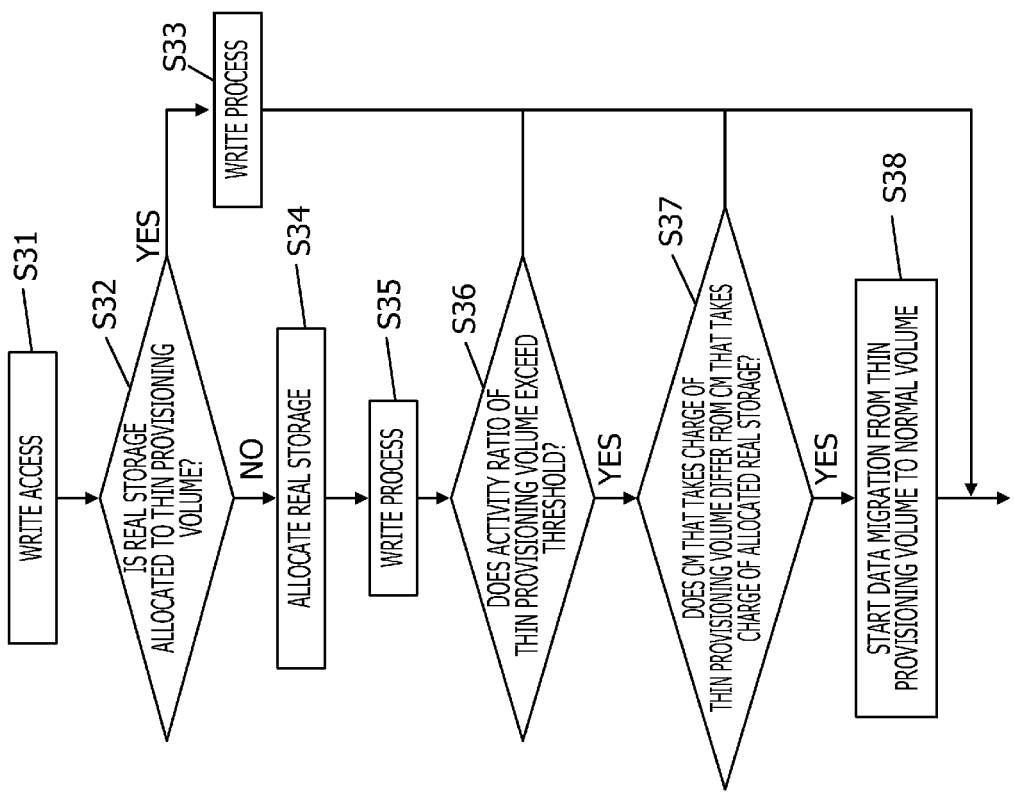
FIG. 5 illustrates procedures for writing data in a thin provisioning volume.

FIG. 5 illustrates procedures for writing data in a thin provisioning volume.

When a host computer 90 sends a request for writing data in a thin provisioning volume to the storage device 10, a CM 12 receives the write request via a CA 11 (S31).

The CM 12 that has received the write request refers to the translation table so as to determine whether or not the storage area of the logical volume in which data is to be written in accordance with the write request is associated with a storage area of a real storage 13 of the CM (S32).

When a storage area of a real storage is allocated to that of the logical volume (Yes in S32), the CPU 21 serving as the read/write section performs the write process in accordance with the write request (S33).

When no storage area of a real storage is allocated (No in S32), the CPU 21 serving as the management section allocates a storage area of a real storage 13 to the storage area of the thin provisioning volume serving as the write target (S34).

After the allocation in S34, the CPU 21 serving as the read/write section performs the write process in accordance with the write request (S35).

When new data is added in S33 or S35, the CPU 21 serving as the detection section detects whether or not the activity ratio of the thin provisioning volume exceeds the threshold (S36).

When the activity ratio does not exceed the threshold in S36, the CPU 21 ends the process. When the activity ratio exceeds the threshold, the CPU determines whether or not the physical storage area corresponding to the storage area of the thin provisioning volume is distributed over real storages assigned to a plurality of CMs 12. That is, the CPU 21 determines whether or not the storage area of the thin provisioning volume whose activity ratio exceeds the threshold is associated with the storage areas of the real storages assigned to other CMs 12 (S37).

When the conditions in S36 and S37 are satisfied, data stored in the thin provisioning volume is migrated to the real logical volumes (S38).

Although the thin provisioning volume has an advantage of reducing initial investment, the access performance may be lowered depending on the conditions. For example, when the storage area of the thin provisioning volume is associated with the physical storage areas managed by the plurality of CMs 12, the read request needs to be transmitted through the communication between the CMs as shown in FIG. 4, resulting in a reduction in the access performance.

The storage device 10 according to the first embodiment can improve the access performance by migrating data stored in the thin provisioning volume to the real logical volumes when the activity ratio of the thin provisioning volume exceeds the threshold and the advantage of the thin provisioning volume disappears. The storage device 10 according to the first embodiment determines whether or not the access performance is lowered in Step S37, and performs migration when the access performance is lowered. That is, the device does not perform migration unnecessarily when the access performance is not lowered.

Moreover, the storage device 10 according to the first embodiment can associate the storage areas of the real logical volumes serving as the target for the migration with the physical storage areas managed by the CMs that manage the real logical volumes serving as the target for the migration when the data is migrated. With this, at least the communication between the CMs in S26 shown in FIG. 4 can be omitted, resulting in an improvement in the access performance.

Furthermore, the communication between the CMs in S23 shown in FIG. 4 is not necessary when the CM 12 that manages the storage area of the thin provisioning volume receives the access request from the host computer 90. Accordingly, when a thin provisioning volume is created, the CM 12 that receives the access request from the host computer 90 is often selected as the CM 12 that manages the storage area of the thin provisioning volume. Therefore, the storage device 10 according to this embodiment sets the real logical volumes managed by the management section that manages the virtual logical volume whose data is to be migrated as the target for the migration when the data is migrated. With this, data can be migrated to appropriate targets.

Figure 6:
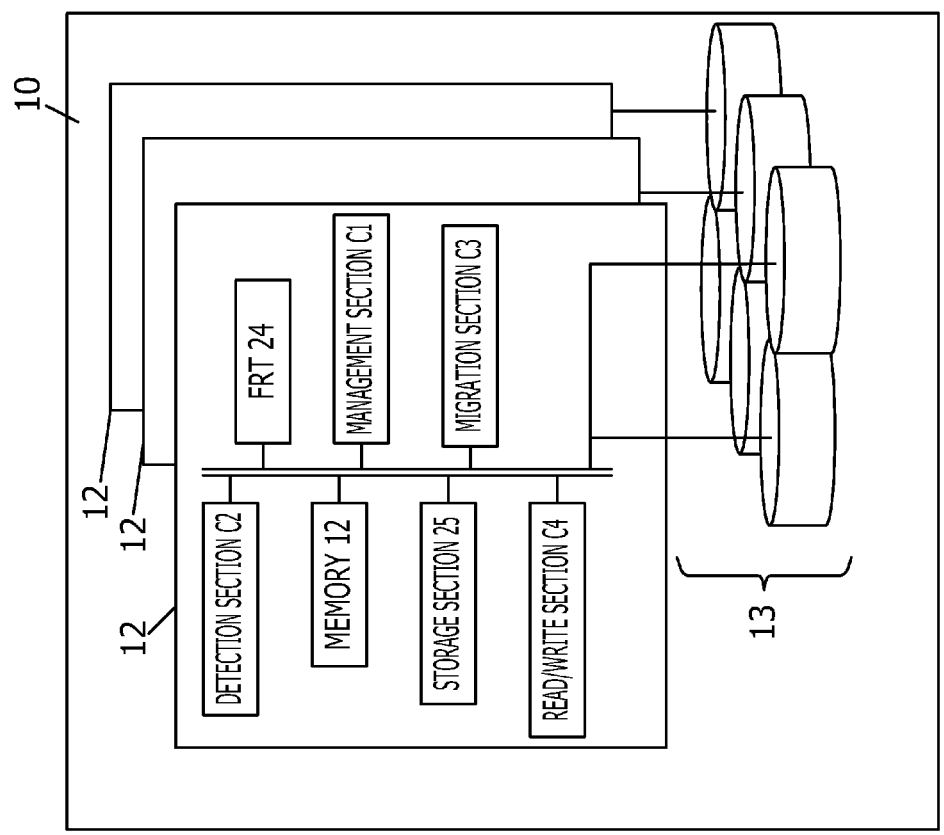
FIG. 6 is a block diagram of a storage device according to a second embodiment.

As illustrated in FIG. 6, a storage device 10 includes a plurality of control units (CMs: centralized modules) 12 and a plurality of real storages 13.

The CMs 12 control accesses to the real storages 13 in response to requests issued from host computers.

The real storages 13 are high-capacity storage units such as hard disk drives that store data requested by the host computers.

Each of the CMs 12 includes a memory 22, a communication section (FRT; front-end router) 24, a storage section 25, a management section C1, a detection section C2, a migration section C3, and a read/write section C4.

The memory 22 functions as, for example, a cache used when the real storages 13 are accessed.

The FRT 24 is an interface that controls the communication between the CMs 12 via a communication path.

The storage section 25 includes, for example, a hard disk drive, a memory disk drive, and a ROM that store setting information and firmware (programs).

The management section C1 manages logically defined storage areas as real logical volumes by associating the storage areas with physical storage areas in advance. Moreover, the management section C1 manages the logically defined storage areas as thin provisioning volumes by associating the storage areas with physical storage areas when data is written.

The management section C1 has correspondences between the logical storage areas and the physical storage areas registered in a translation table in the memory 22.

Moreover, the management section C1 reads identification information out of the real storages 13 when the real storages 13 are connected to the CM, and adds the identification information to a table of assigned storages in the memory 22 as information indicating that the CM 12 including the management section takes charge of the real storages 13. Furthermore, the management section C1 associates the identification information of the CM 12 including the management section with the identification information of the real storages 13 assigned to the CM, and sends the correspondences to other CMs 12 so that the tables of the storages assigned to the CMs 12 are updated. The tables of the assigned storages indicate which CMs 12 take charge of which real storages, and include correspondences between the identification information of the CMs 12 that take charge of the real storages 13 and the identification information of the storages assigned to the CMs.

The detection section C2 detects whether or not the following conditions are satisfied, that is, whether or not the activity ratio of the thin provisioning volumes exceeds a threshold and whether or not the physical storage areas corresponding to the storage areas of the thin provisioning volumes are managed by other CMs. For example, the detection section C2 refers to the translation table so as to determine a ratio $Qa/Qz$ of the total capacity $Qa$ of the storage areas defined as the thin provisioning volumes to the capacity $Qz$ of the storage areas of the real storages 13 associated with the logical storage areas of the thin provisioning volumes as the activity ratio of the thin provisioning volumes. Subsequently, the detection section C2 refers to the translation table so as to determine whether or not the logical storage areas of the thin provisioning volumes are associated with the storage areas of the real storages 13 managed by other CMs 12.

The migration section C3 migrates data stored in the thin provisioning volumes to the real logical volumes when the detection section C2 determines that the above-described conditions are satisfied. That is, the migration section C3 allocates physical storage areas with a capacity equivalent to the capacity of the thin provisioning volumes to the free spaces of the real storages 13, and moves the data stored in the thin provisioning volumes to the storage areas.

With this structure, the storage device 10 according to the second embodiment can improve the access performance by migrating data stored in the thin provisioning volumes to the real logical volumes when the activity ratio of the thin provisioning volumes exceeds the threshold and the advantage of the thin provisioning volumes disappears. The storage device 10 according to the second embodiment determines whether or not the access performance is lowered in S37, and performs migration when the access performance is lowered. That is, the device does not perform migration unnecessarily when the access performance is not lowered.

Moreover, the storage device 10 according to the second embodiment can associate the storage areas of the real logical volumes serving as the target for the migration with the physical storage areas managed by the CMs that manage the real logical volumes serving as the target for the migration when the data is migrated. With this, at least the communication between the CMs in S26 shown in FIG. 4 can be omitted, resulting in an improvement in the access performance.

Furthermore, the storage device 10 according to this embodiment can set the real logical volumes managed by the management section that manages the virtual logical volumes whose data is to be migrated as the target for the migration when the data is migrated. With this, data can be migrated to appropriate targets.

Components that process information among the components in the storage device 10 according to the above-described embodiments are hardware including a combination of basic circuits that perform specific operations and capable of performing each function of the circuits. Moreover, a part of or all of the components that process the information can perform the functions using general-purpose processors that execute programs serving as software.

In the storage device 10, the components that process the information include, for example, the management section, the detection section, the migration section, and the read/write section.

The hardware serving as the components that process the information include basic circuits such as field-programmable gate arrays (FPGAs), application-specific integrated circuits (ASICs), and large-scale integrated circuits (LSIs). Moreover, the hardware can include basic circuits such as integrated circuits (ICs), gate arrays, logical circuits, signal processing circuits, and analog circuits.

The logical circuits include, for example, AND circuits, OR circuits, NOT circuits, NAND circuits, NOR circuits, flip-flop circuits, and counter circuits. The signal processing circuits can include circuits performing, for example, addition, multiplication, division, inversion, product sum, differentiation, and integration on signal values. The analog circuit can include, for example, circuits performing amplification, addition, multiplication, differentiation, and integration on signal values.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A control unit for a storage device that stores data, comprising:

a management section that manages a logically defined storage area as a real logical volume by associating the storage area with a physical storage area in advance and that manages the logically defined storage area as a virtual logical volume by associating the storage area with a physical storage area when data is added;

a determination section that determines whether or not the activity ratio of the virtual logical volume exceeds a threshold and whether or not the physical storage area associated with a storage area of the virtual logical volume is managed by another control unit; and a migration section that migrates data stored in the virtual logical volume to the real logical volume when the activity ratio of the virtual logical volume exceeds the threshold and the physical storage area associated with the storage area of the virtual logical volume is managed by another control unit.

2. The control unit according to claim 1, wherein the storage area of the real logical volume serving as the target for the migration is associated with the physical storage area managed by the management section that manages the real logical volume serving as the target for the migration when the data is migrated.

3. The control unit according to claim 1, wherein the real logical volume managed by the management section that manages the virtual logical volume whose data is to be migrated is set as the target for the migration when the data is migrated.

4. A method for controlling a storage device that stores data, comprising:

managing a logically defined storage area as a real logical volume by associating the storage area with a physical storage area in advance and managing the logically defined storage area as a virtual logical volume by associating the storage area with a physical storage area when data is added;

determining whether or not the activity ratio of the virtual logical volume exceeds a threshold and whether or not the physical storage area associated with a storage area of the virtual logical volume is managed by another control unit; and migrating data stored in the virtual logical volume to the real logical volume when the activity ratio of the virtual logical volume exceeds the threshold and the physical storage area associated with the storage area of the virtual logical volume is managed by another control unit.

5. The control method according to claim 4, wherein the storage area of the real logical volume serving as the target for the migration is associated with the physical storage area managed by a management section that manages the real logical volume serving as the target for the migration when the data is migrated.

6. The control method according to claim 4, wherein the real logical volume managed by a management section that manages the virtual logical volume whose data is to be migrated is set as the target for the migration when the data is migrated.

7. A storage device storing data, comprising:

a plurality of storage units;

a management section that manages a logically defined storage area as a real logical volume by associating the storage area with a physical storage area created using the plurality of storage units in advance and that manages the logically defined storage area as a virtual logical volume by associating the storage area with a physical storage area when data is added;

a determination section that determines whether or not the activity ratio of the virtual logical volume exceeds a threshold and whether or not the physical storage area associated with a storage area of the virtual logical volume is managed by another control unit; and a migration section that migrates data stored in the virtual logical volume to the real logical volume when the activity ratio of the virtual logical volume exceeds the threshold and the physical storage area associated with the storage area of the virtual logical volume is managed by another control unit.

* * * * *